United States Patent [19]
Nels

[11] Patent Number: 5,558,317
[45] Date of Patent: Sep. 24, 1996

[54] VOLUTE SPRINGS ADAPTED FOR TORSIONAL DAMPER ASSEMBLIES AND METHOD OF MANUFACTURING SAME

[75] Inventor: Terry E. Nels, Beavercreek, Ohio

[73] Assignee: General Motors Corporation, Detroit, Mich.

[21] Appl. No.: 187,430

[22] Filed: Jan. 26, 1994

[51] Int. Cl.$^6$ .................................................. F16F 1/10
[52] U.S. Cl. .............................. 267/156; 464/66; 464/68
[58] Field of Search .................................. 267/272, 275, 267/156, 214, 200; 464/7, 61, 62, 64, 66, 68; 192/106.1

[56] References Cited

U.S. PATENT DOCUMENTS

| 3,373,855 | 3/1968 | Ericson | 464/68 X |
| 4,789,374 | 12/1988 | Suzuki | 464/64 |
| 5,090,945 | 2/1992 | Graton et al. | 464/64 |
| 5,203,835 | 4/1993 | Kohno et al. | 464/68 X |
| 5,209,334 | 5/1993 | Fischer et al. | 464/68 X |
| 5,401,213 | 3/1995 | Muchmore et al. | 464/64 X |

FOREIGN PATENT DOCUMENTS

| 0445854 | 11/1912 | France | 464/66 |
| 2138105 | 10/1984 | United Kingdom | 192/106.1 |

Primary Examiner—Daniel P. Stodola
Assistant Examiner—William A. Rivera
Attorney, Agent, or Firm—Donald F. Scherer

[57] ABSTRACT

A volute spring that is particularly adapted to be incorporated in a damper assembly to absorb or neutralize the transient torsional spikes normally occurring at the crankshaft of a vehicle. A volute spring having the improved frictional hysteresis characteristic provided by the present invention utilizes the conventional plurality of telescopically adjacent coils, and each coil has oppositely directed surfaces which present opposed surfaces on the telescopically adjacent coils. At least one of the opposed engaging surfaces has a configuration that obviates the formation of a hydrodynamic oil film. One configuration that obviates the formation of a hydrodynamic oil film comprises a plurality of intersecting grooves recessed into at least one surface of the metallic strip from which the volute spring is wound. The intersecting grooves define a plurality of polygonal lands which cumulatively provide at least one of the engaging surfaces on the adjacent coils of the volute spring. Another configuration that obviates the formation of a hydrodynamic oil film utilizes a porous surface such as may be provided by conventional paper and resin clutch wear materials. The clutch wear material is bonded to at least one of the opposed surfaces of the metallic strip from which the volute spring is wound.

6 Claims, 7 Drawing Sheets

VOLUTE SPRINGS ADAPTED FOR TORSIONAL DAMPER ASSEMBLIES AND METHOD OF MANUFACTURING SAME

TECHNICAL FIELD

The present invention relates generally to damper assemblies. More particularly, the present invention relates to damper assemblies adapted for absorbing torsional spikes associated with vehicular engines and thereby isolating the source of the spikes. Specifically, the present invention relates to damper assemblies that utilize uniquely configured volute springs, wherein at least one surface on the metallic strip forming the adjacent coils of the spring is configured to provide controlled frictional hysteresis by which to absorb the transient torsional spikes imparted by the crankshaft of a vehicular engine.

BACKGROUND OF THE INVENTION

Dampers or torsional spike isolators have long been employed in conjunction with prior art transmissions for the purpose of absorbing or neutralizing torsional force aberrations or spikes emanating from the engine of the vehicle.

Torque converters are commonly employed in a vehicle to couple the engine to an automatic transmission. Torque converters employ a pump, commonly identified as an impeller, to direct hydraulic fluid through the torque converter. The impeller is rotated by the crankshaft of the engine, and a turbine is operatively attached to the input shaft of the vehicular transmission. A finned wheel, called a stator, is generally interposed between the impeller and the turbine to redirect the flow of hydraulic fluid within the torque converter.

The engine torque available at the turbine, which is transferred from the impeller to the turbine by means of the fluid coupling within the torque converter, can never quite be equal to the torque delivered from the impeller. This torque loss occurs because of inefficiencies in the fluid coupling, and the inefficiencies are evidenced by the rotational "slip" between the rotation of (or torque transfer from) the turbine with respect to the rotation of (or torque delivered to) the impeller. The fluid redirection accomplished by the operation of the stator in the torque converter almost overcomes this slip, but the ability of the turbine to slip with respect to the impeller serves to absorb the well known and recognized torsional spikes associated with the engine of the vehicle.

Because the stator does not completely overcome the slip, and to improve the efficiency of the transmission even further, a converter clutch—often designated as a "lock-up" clutch—is provided selectively to effect a direct drive between the impeller and the turbine portions of the torque converter. In those installations which incorporate a converter clutch to effect the desired direct drive across the torque converter during certain phases of the vehicular operation, the torque converter is precluded from absorbing torsional spikes while the converter clutch is operatively engaged. Thus, the utilization of a damper assembly within the torque converter itself allows the advantageous use of a converter clutch and also neutralizes the adverse affect of torsional spikes, even when a converter clutch is in use.

Standard transmissions, which operate without a torque converter, do not neutralize the adverse torsional spikes imparted by the engine without the inclusion of a component intended expressly for that purpose. Such installations generally employ a torsional damper within the drive train and locate the damper downstream from the engine.

Typical prior art damper assemblies have heretofore employed a plurality of compression spring members that absorb the transient torque spikes normally imparted to the crankshaft of the vehicle by the engine. One such assembly is disclosed in U.S. Pat. No. 5,009,301 issued to Spitler, Apr. 23, 1991, assigned to the assignee of the present invention.

To that end, it is desired to provide volute springs having a frictional hysteresis characteristic which makes them particularly suited for absorbing or neutralizing transient torsional vibrations or spikes. Frictional hysteresis provides a retarding effect to counteract the tendency of the spring to react over-promptly when the forces acting on the springs undergo virtually instantaneous changes.

While volute springs advantageously absorb spike loading, the prior known volute spring configurations suffer one primary drawback when used in applications requiring hundreds of thousands of compression cycles, such as occur when seeking to neutralize the torsional spikes imparted by an internal combustion engine. Specifically, fifty (50) to one hundred (100) percent of the coulomb (metal-to-metal) hysteresis characteristic in a standard volute spring is lost after being subjected to as few as 500,000 compression cycles. With the resulting loss of the coulomb hysteresis characteristic, the response time of the volute spring is too short to effect satisfactory damping of the loading spikes.

This reduction or loss of frictional hysteresis is due to wear "polishing" of the adjacent surfaces on the coils of the volute spring which rub together. That is, the continuous frictional contact between the adjacent surfaces on the coils of volute springs eventually eliminates the small surface grooves in the frictionally engaging surfaces.

In developing the present invention, it was determined that these small surface grooves allow lubricating oil to squeeze out between the layers of the mating surfaces of the volute spring, thereby maintaining the coulomb friction between the surfaces on the adjacent coils of the volute spring as they move with respect to each other. Without these surface grooves, however, a hydrodynamic oil film builds up between the adjacent coils. The loss of coulomb hysteresis occurs because the resulting hydrodynamic oil film does not permit the frictional contact necessary to effect frictional hysteresis.

The relatively low life span—e.g., 500,000 compression cycles—of the prior art volute springs makes it impractical for their usage in a mechanical device such as a damper assembly adapted for use in the drive train of a vehicle.

SUMMARY OF THE INVENTION

It is, therefore, a primary object of the present invention to provide an improved volute spring that may be advantageously incorporated in a torsional damper assembly associated with a vehicular drive train.

It is another object of the present invention to provide an improved volute spring, as above, wherein at least one of the mating surfaces in the volute spring is provided with a unique surface configuration which maintains the friction between the relatively movable mating surfaces on the adjacent coils of the volute spring—even in the presence of oil—in order to preserve the desired hysteresis characteristic of the volute spring.

It is a further object of the present invention to provide a volute spring, as above, wherein at least one of the mating surfaces on the successive coils forming the volute spring is provided with a surface configuration that precludes the formation of a hydrodynamic oil film between the mating surfaces so that hysteresis is maintained for an extended number of cycles.

It is still another object of the present invention to provide a damper assembly that may employ volute springs, as above, in combination with helical springs.

It is yet another object of the present invention to provide a volute spring for a damper assembly, as above, that is easily inserted into, and advantageously cooperates with, an already existing compression type spring so that the combination provides an improved hysteresis effect.

It is an even further object of the present invention to provide a method of making such volute springs, wherein the desired surface configuration is provided prior to coiling the strip of metal from which the volute spring is fabricated.

These and other objects of the invention, as well as the advantages thereof over existing and prior art forms, which will be apparent in view of the following detailed specification, are accomplished by means hereinafter described and claimed.

In general, a plurality of volute springs embodying the concepts of the present invention may be incorporated in a damper assembly to absorb or neutralize the transient torsional spikes normally occurring at the crankshaft of a vehicle.

A volute spring having the improved frictional hysteresis characteristic provided by the present invention is still comprised of a plurality of telescopically adjacent coils, and each coil has oppositely directed surfaces which present opposed surfaces on the telescopically adjacent coils. The opposed surfaces provide a long term frictional hysteresis engagement therebetween. To that end, at least one of the opposed engaging surfaces has a configuration that obviates the formation of a hydrodynamic oil film and thereby precludes degradation of the desired hysteresis resulting from frictional engagement between the adjacent coils.

One configuration that obviates the formation of a hydrodynamic oil film comprises a plurality of intersecting grooves recessed into at least one surface of the metallic strip from which the volute spring is wound. The intersecting grooves define a plurality of polygonal lands. The plateau-like surface on each of the lands cumulatively provide at least one of the engaging surfaces on the adjacent coils of the volute spring.

Another configuration that obviates the formation of a hydrodynamic oil film utilizes a porous surface, such as may be provided by conventional paper and resin clutch wear materials. The clutch wear material is bonded to at least one of the opposed surfaces of the metallic strip from which the volute spring is wound.

The present invention also provides a process for fabricating the uniquely configured volute springs.

To acquaint persons skilled in the arts most closely related to the present invention, one preferred embodiment of a torsional damper assembly that employs the uniquely configured volute springs—two embodiments of which are depicted—and which illustrate the best modes now contemplated for putting the invention into practice, are described herein by and with reference to, the annexed drawings that form a part of the specification. A representative damper assembly, and the unique volute springs used therein, are described in detail without attempting to show all of the various forms and modification in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

Figure 1:
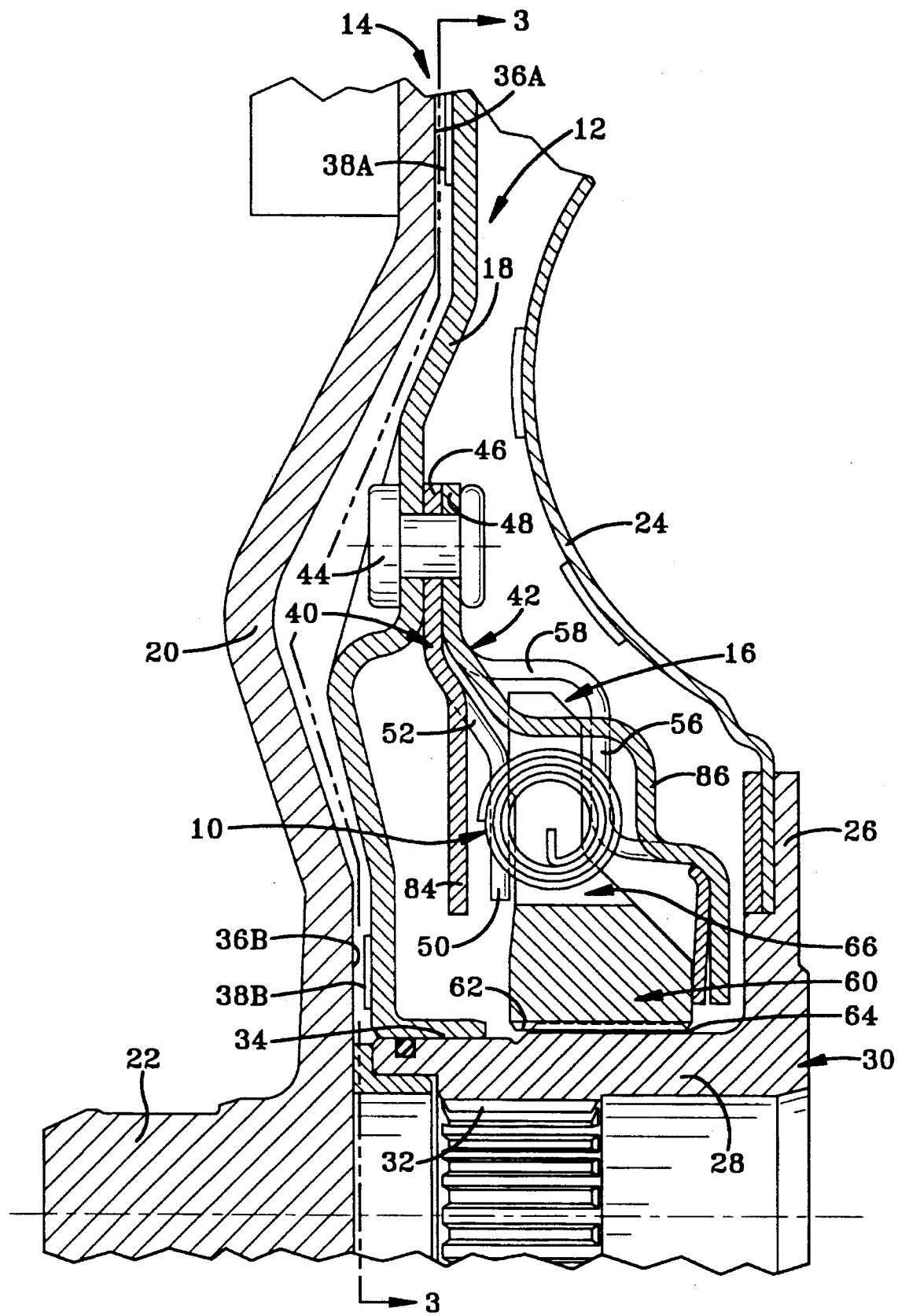
FIG. 1 is a vertical section through a representative embodiment of a torsional damper assembly, such as might be employed in conjunction with a torque converter used with an automatic transmission, and which incorporates an exemplary embodiment of the novel and unique volute spring configuration to which the present invention is directed, the converter clutch being disengaged.
Figure 1A:
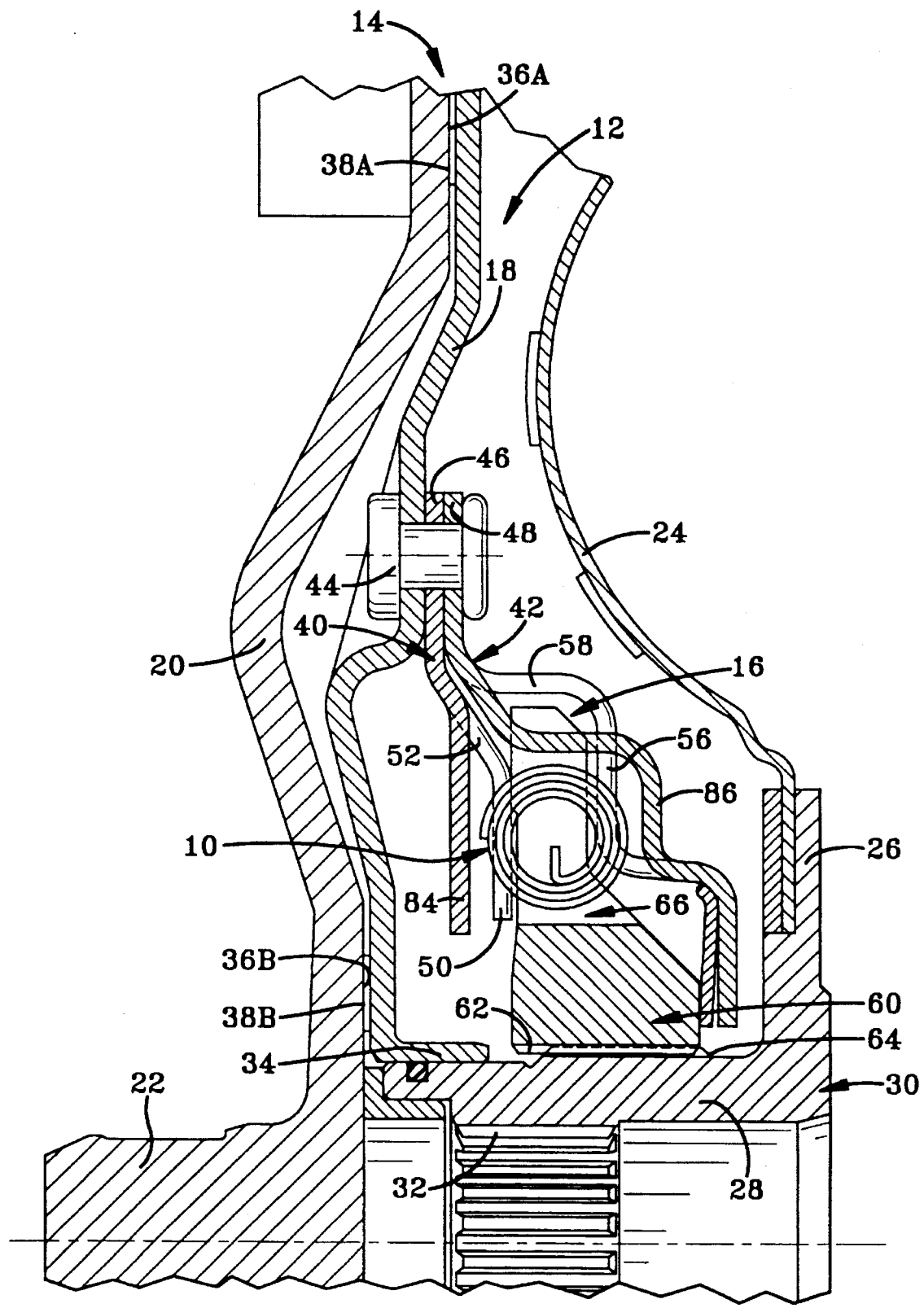
FIG. 1A is a view similar to FIG. 1 except that the converter clutch is engaged.
Figure 2:
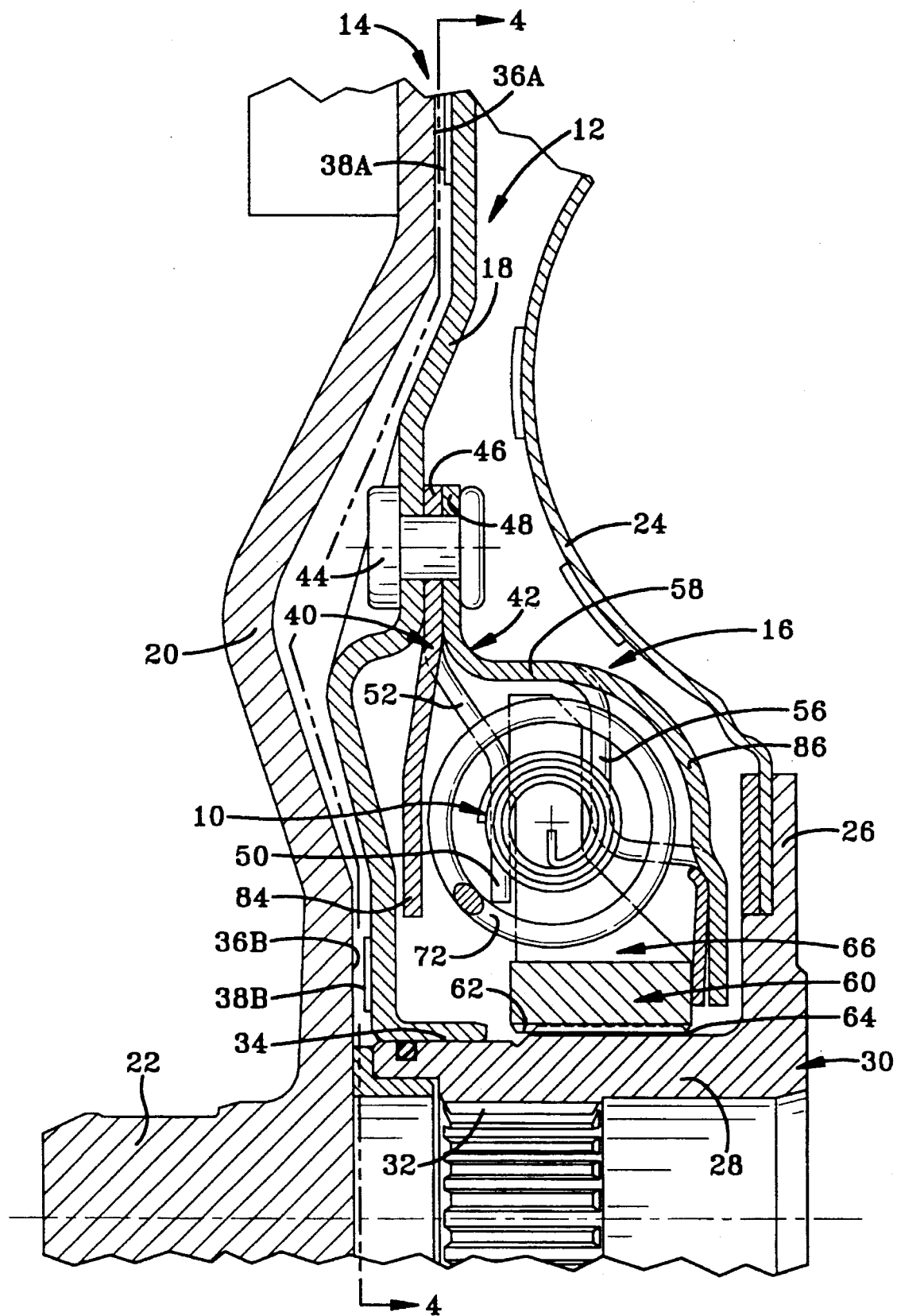
FIG. 2 is a view similar to FIG. 1, except that the volute spring embodying the concepts of the present invention is circumscribed by a helical compression spring within a torsional damper assembly, such as might be employed in conjunction with a torque converter used with an automatic transmission.
Figure 3:
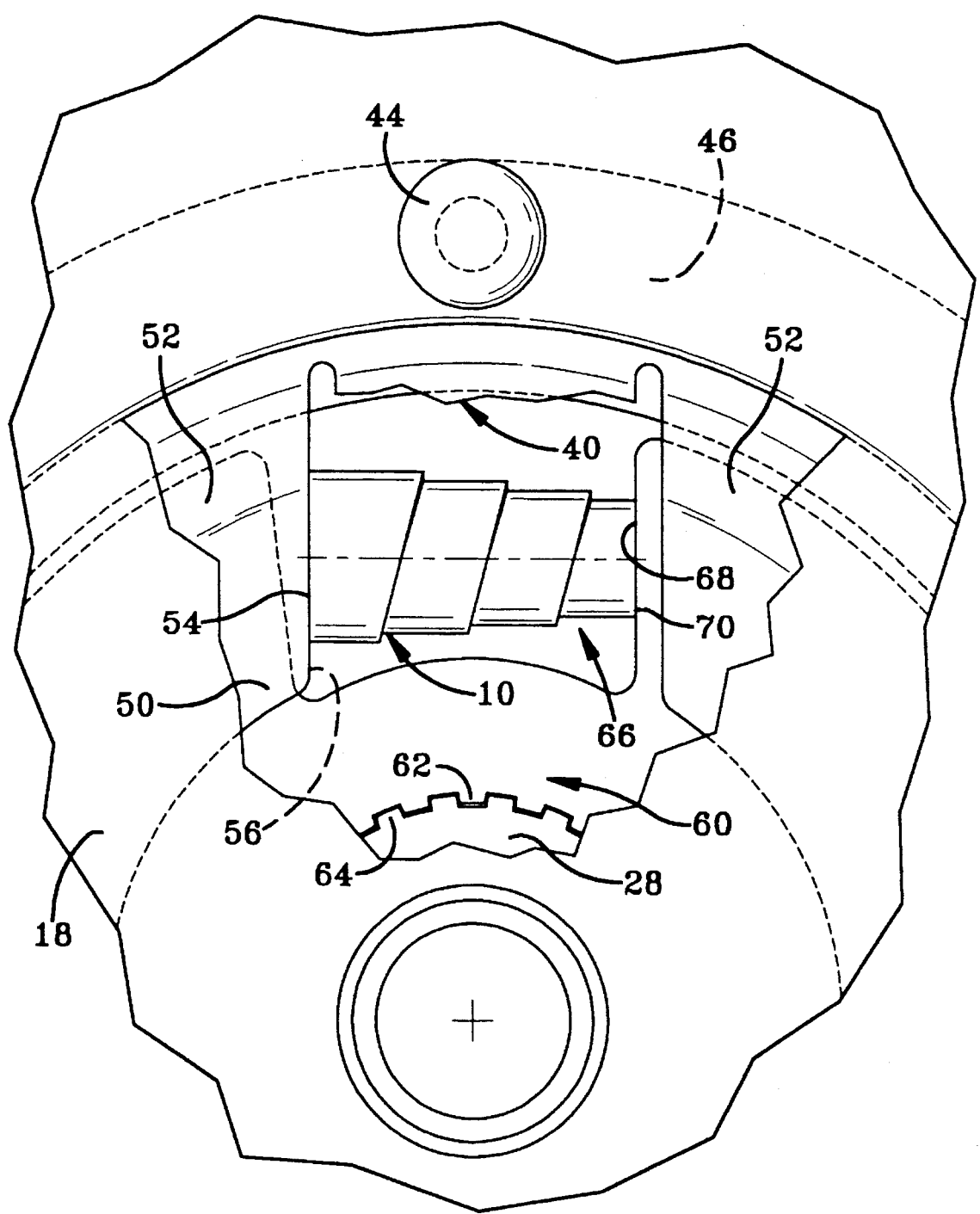
FIG. 3 is a sectional view taken substantially along line 3—3 of FIG. 1.

Referring to the drawings, wherein like characters represent the same or corresponding parts throughout the several views, one representative form of a unique volute spring that embodies the concepts of the present invention is designated generally by the numeral 10 and is depicted in FIGS. 1 through 5. As best seen in FIGS. 1 and 3, one or more of the volute springs 10 may be utilized in a combined converter clutch and damper assembly 12. With the historically employed helical compression springs, a greater number of springs were required than are required with the improved volute springs 10.

The combined converter clutch and damper assembly 12 may include both a converter clutch subassembly 14 and a damper subassembly 16, and as such, is particularly adapted for use in conjunction with a well known conventional torque converter (not completely shown). However, as will be more apparent to one who understands the present invention, the concepts of the damper subassembly 16 may, if desired, be adapted for operation without a torque converter, such as would occur with a standard transmission.

The converter clutch subassembly 14 utilizes a plate 18 to serve the function of a clutch disk, as will be briefly explained in conjunction with the description of the converter clutch subassembly 14. The plate 18 is also utilized by the damper subassembly 16 to serve the function of an isolator drive plate, as will be explained in conjunction with the description of the damper subassembly 16.

The input shell 20 may be secured to an engine crankshaft 22, either integrally, as depicted, or through a conventional flex plate (not shown). The input shell 20 extends circumferentially about the torque converter to be connected to the impeller (not shown), and rotation of the impeller by the input shell 20 effects rotation of the turbine 24 by the fluid drive inherent to the operation of a torque converter. The turbine 24 is supported in a well known manner from a bifurcated mounting flange 26 that extends radially outwardly from the body portion 28 of an output hub 30. The generally cylindrical hollow interior of the output hub 30 may, as shown, be provided with splines 32 to facilitate a connection to the input shaft (not shown) of a power transmission (also not shown). When the torque converter is operating it will serve to absorb torsional spikes imposed from the crankshaft 22.

As such, a driving connection between the crankshaft 22 and the output hub 30 may be accomplished through a torque converter in the customary fashion, even though the torque converter incorporates a combined converter clutch and damper assembly 12.

To improve the efficiency of the transmission, the converter clutch subassembly 14 may be selectively energized to provide a direct drive connection between input shell 20 and the output hub 30, thereby eliminating the inherent hydraulic losses associated with torque converters. However, the clutch and damper assembly 12 is a mechanical transmitting device which is capable of transmitting the engine torque while still reducing the transient torsional vibrations occurring at the crankshaft 22.

With continued reference to FIG. 1, it can be observed that the plate 18 has an annular inner hub flange 34 that is supported on the body portion 28 of the output hub 30 for rotation as well as axial translation with respect to the output hub 30. When serving as a converter clutch disc, the plate 18 may be operated in a conventional manner by the pressure of the hydraulic fluid within the torque converter to provide controlled engagement and disengagement between the opposed reaction surfaces 36A and 36B on the input shell 20 and the friction disks 38A and 38B mounted on the plate 18, as is well known to the art. It is also well known that when the converter clutch is engaged, the torque converter is not available to dampen the torsional spikes produced by the engine. Hence, when the converter clutch subassembly 14 is engaged, the damper subassembly 16 must be operative to neutralize torsional torque spikes.

In the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are two opposed reaction surfaces employed in the converter clutch subassembly 14. The opposed reaction surfaces are generally identified by the numeral 36, but the specific individual reaction surfaces are, therefore, identified as 36A and 36B in the specification and on the drawings. This same suffix convention shall be employed throughout the specification.

When serving as a converter clutch disc, the plate 18 is rotatably driven with the input shell 20 by virtue of the fact that the converter clutch subassembly 14 is engaged. First and second isolator drive plates 40 and 42, respectively, are secured to the plate 18, as by a plurality of rivets 44, which extend through the anchor portions 46 and 48 of the respective first and second drives plate 40 and 42.

A plurality of tangs 50—preferably equal in number to the number of volute springs 10 that are employed in the damper subassembly 16—extend laterally outwardly from the plane of the anchor portion 46 presented by the first drive plate 40. This laterally outward disposition can be achieved, as by the dogleg extension 52, to locate the tangs 50 in contiguous juxtaposition with one side portion on the first end 54 of the appropriate volute spring 10. A plurality of circumferentially spaced tangs 56—preferably also equal in number to the number of volute springs 10 that are employed in the damper subassembly 16—extend laterally outwardly from the plane of the anchor portion 48 presented by the second drive plate 42. Here, too, the laterally outward disposition can be achieved, as by a dogleg extension 58, to locate the tangs 56 in contiguous juxtaposition with the diametrically opposite side portion on the first end 54 of the appropriate volute spring 10.

An intermediate ring 60 circumscribes the output hub 30, and the intermediate ring 60 is secured to the body portion 28 of the output hub 30, as by splines 62 on the annular, central aperture of the intermediate ring 60 which meshingly engage the correspondingly opposed splines 64 that project radially outwardly from the body portion 28 of the output hub 30. The intermediate ring 60 is recessed, as at 66, at circumferentially spaced intervals about the periphery thereof in order to receive the volute springs 10. The proximity of the recess 66 to the spring 10, together with not only the proximity of the blocking extension 84 on drive plate 40—located between the tangs 50 on one side of the volute spring 10—but also the proximity of the blocking extension 86 on drive plate 42—located between the tangs 56 on the other side of the volute spring 10—serve to encase the spring 10 and maintain it loosely in situ. It should be explained, however, that the volute spring 10 is partially stressed when it is received between the tangs 50 and 56 which engage one end 54 of spring 10 and the seat 68 which engages the other end 70 of spring 10.

One end wall on each recess 66 forms a spring seat 68 to engage the second end portion 70 (FIG. 3) on the appropriate volute spring 10. Should it be deemed desirable, the seat 68 may be provided with some means, such as a post or a recess (neither of which are shown) to fix the location of the end 70 on spring 10 with respect to the seat 68. This same configuration may be employed to cage the helical compression spring 72, as shown in FIG. 2.

As such, when the converter clutch subassembly 14 is engaged, a driving connection between the plate 18 and the output hub 30 is completed through the damper subassembly 16, as is also well known to the art.

The specific configuration of the volute springs 10 disclosed herein are not, however, known to the prior art.

The spring means which embody the concepts of the present invention, and which are particularly adapted for use in combination with the damper subassembly 16, are preferably of the volute type about to be described, or they may comprise combinations of helical and volute springs, as shown in FIGS. 2 and 3A.

Figure 4:
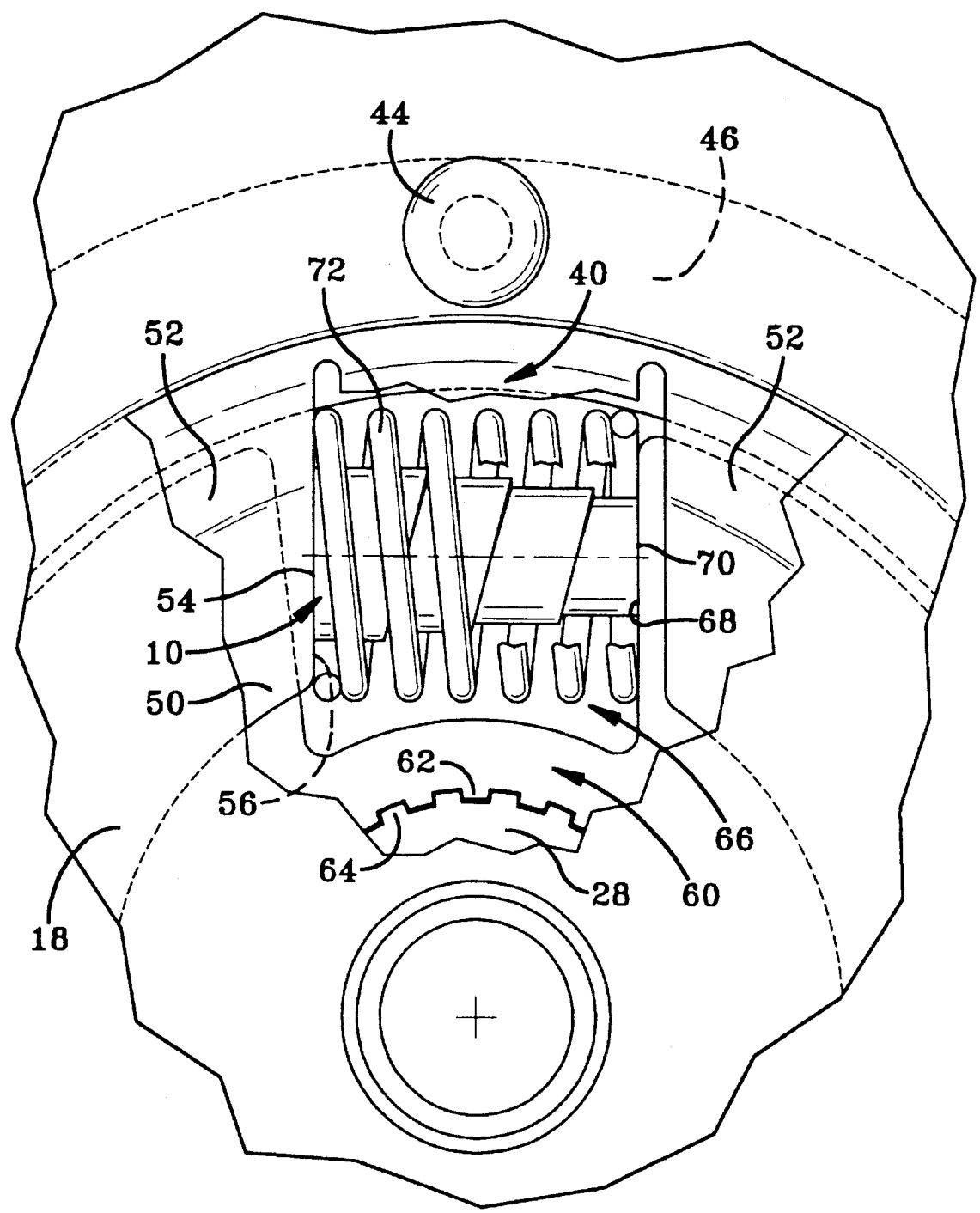
FIG. 4 is a sectional view similar to FIG. 3 but taken substantially alone line 4—4 of FIG. 2 in order to depict the volute spring disposed concentrically within a conventional helical compression spring.
Figure 5:
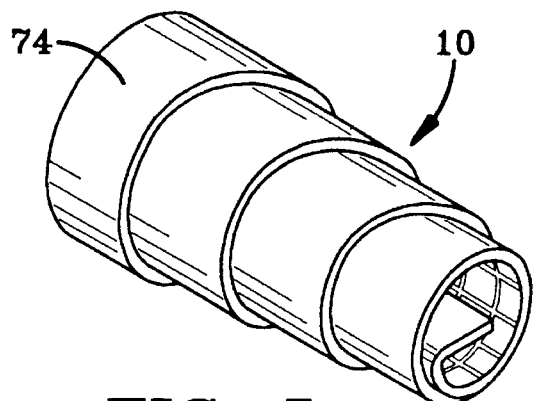
FIG. 5 is an enlarged perspective view of the volute spring depicted in FIGS. 1 through 3.

As best seen in FIGS. 4 and 5, volute springs 10—which suffice quite well without the need for the helical compression spring 72 depicted in FIGS. 2 and 3A—have adjacent turns or coils of a spiral or scroll-shaped form. Each of the volute springs 10 thus consists of a relatively wide thin strip 74 of metal wound so that each turn or coil telescopes with respect to the proceeding coil. The strip 74 from which the volute spring 10 is preferably made should be capable of being wound and placed into a stressed condition. Such material may be selected from the group comprising: (1) carbon and martensitic stainless steel; and, (2) nonferrous and austenitic stainless steel. The material of the volute spring 10 is stressed in torsion during the fabrication of the spring. Such a volute spring, when fully compressed, has a solid height equal to the maximum width of the strip 74.

Volute springs 10, as compared to conventional helical compression springs 72, can store large amounts of energy in a relatively small space. Other advantages include superior vibration dampening provided by friction—generally a coulomb friction, but may well be a metal-to-composite pad friction—between the adjacent coils, extra absorption of impact energy, good lateral stability and a non-linear low deflection curve.

The volute springs 10, because of their hysteresis characteristic, are particularly suited for vibration dampening action such as occurring in a torsional damper assembly. Metal-to-metal friction between the relative motion of adjacent coils of the volute spring provides a coulomb hysteresis or retarding effect when the forces acting on the volute spring are suddenly changed. That hysteresis characteristic, when used in a damper subassembly 16, reduces the transient torsional vibrations that commonly occur on the crankshaft of a vehicular engine.

As discussed in the "Background of the Invention", the life span of volute springs, without the benefits of the present invention, are limited to approximately 500,000 compression cycles before a 50% to 100% loss of the coulomb hysteresis frictional characteristic occurs. This limited life span makes prior art volute springs unsuitable for use in vehicular damper assemblies.

It is commonly accepted that the aforesaid loss is due to the "polishing" of adjacent surfaces rubbing together, which eventually eliminates the small surface grooves existing in the initially fabricated prior art volute springs. The loss of such grooves allows for a hydrodynamic oil film to build-up on adjacent surfaces, which eliminates the metal-to-metal friction that results by virtue of the relative motion between adjacent coils of the volute spring.

Figure 6:
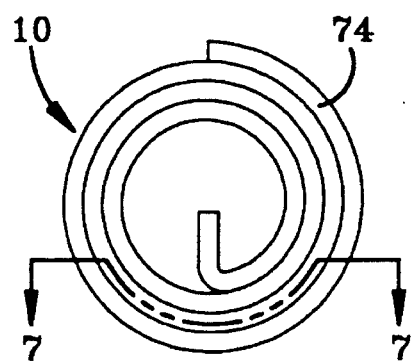
FIG. 6 is an end elevation of the volute spring depicted in FIG. 5.
Figure 7:
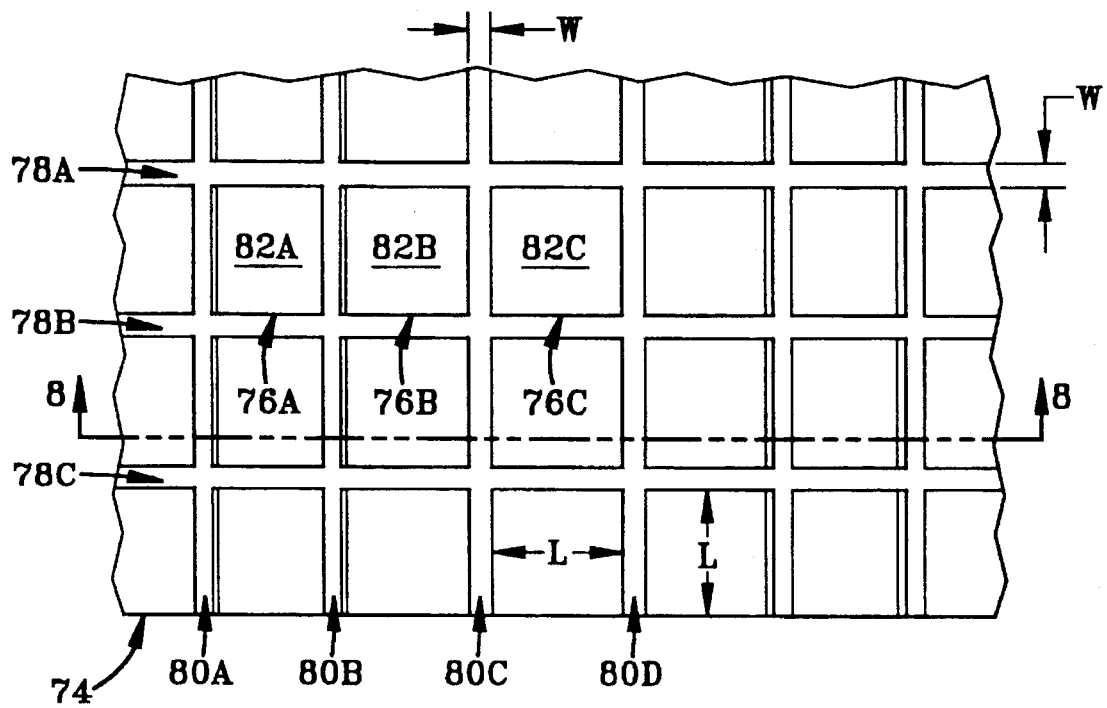
FIG. 7 is a further enlarged sectional view taken substantially along line 7—7 of FIG. 6 to depict, in plan, one form of the surface configuration utilized on the successively engaged metallic coils forming the improved volute spring.

With particular reference to FIGS. 6 and 7, one form of the present invention eliminates such a problem by providing a plurality of quadrilateral lands or plateaus 76 defined by intersecting first and second grooves 78 and 80, respectively, in at least one of the surfaces on the metallic strip 74 from which the volute springs 10 are wound. For example, the intersection of grooves 78A and 78B with grooves 80A, 80B, 80C and 80D, form lands 74A, 74B and 74C. The intersecting grooves 78 and 80 divert the hydrodynamic oil film away from the engaging surface 82 on each land 76 and thereby allow for continued metal-to-metal or coulomb friction. The intersecting grooves 78 and 80 combine with the lands 76 to ensure that there is no means by which to create a hydrodynamic oil film, even after extended cycling of the volute springs 10 in a damper subassembly 16. More particularly, the area of the engaging surface 82 on each land 76 is selected so as to be insufficient to allow a build-up of any significant hydrodynamic oil film, and the width and depth of the intersecting grooves 78 and 80 are selected so the excess oil will be dumped into the atmosphere within the damper subassembly 16. The cooperative action between the lands 76 and the intersecting grooves 78 and 80 substantially prevents the creation of a hydrodynamic oil film during the cycling of the volute springs 10.

Figure 8:
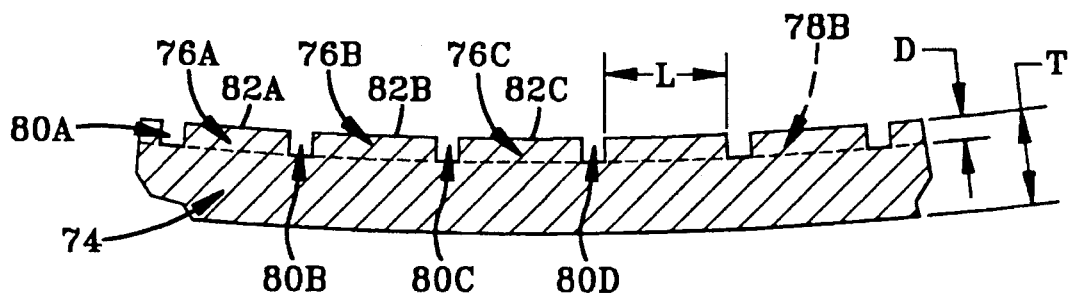
FIG. 8 is a transverse section taken substantially along line 8—8 of FIG. 7.

FIG. 7 illustrates, in an enlarged manner, the top or engaging surfaces 82 of the quadrilateral lands 76 presented from at least one side of the thin metallic strip 74 forming the adjacent coils of the volute springs 10. FIG. 8 illustrates a side view of the quadrilateral lands 76.

The plurality of lands 76 which present the engaging surfaces 82 are defined and separated from each other by the plurality of first and second intersecting grooves 78 and 80, respectively. The lands 76 may preferably be of a square shape with each side a length shown by dimension line "L", whereas the grooves 78 and 80 may have a width "W" and a depth "D", as shown on FIGS. 6 and 7. The volute springs 10 also have a thickness "T" with a typical value of about 12 mils (0.305 mm.). Typical ranges for the width and depth dimensions of the grooves 78 and 80, as well as the side dimensions or length of the individual lands 76, are set forth in Table 1, as follows:

TABLE 1

| DIMENSION | RANGE |
| --- | --- |
| Length "L" | 0.005–0.200 inches |
|  | 0.127–5.08 mm. |
| Width "W" | 0.001–0.100 inches |
|  | 0.0254–2.54 mm. |
| Depth "D" | 0.001–0.100 inches |
|  | 0.0254–2.54 mm. |

As previously discussed, the lands 76, in cooperation with the intersecting grooves 78 and 80, eliminate any hydrodynamic film build-up between adjacent coils so that the desired hysteresis characteristic is maintained over an extended life so as to allow the volute springs to be advantageously used in a damper subassembly 16 in a vehicular drive train.

Figure 9:
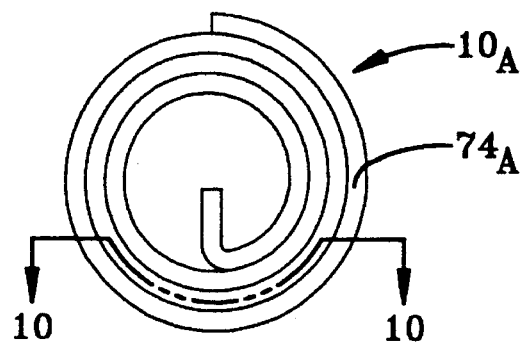
FIG. 9 is a view similar to FIG. 7 to depict, in plan, an alternative form of the surface configuration utilized on the successively engaged metallic coils forming the improved volute spring.
Figure 10:
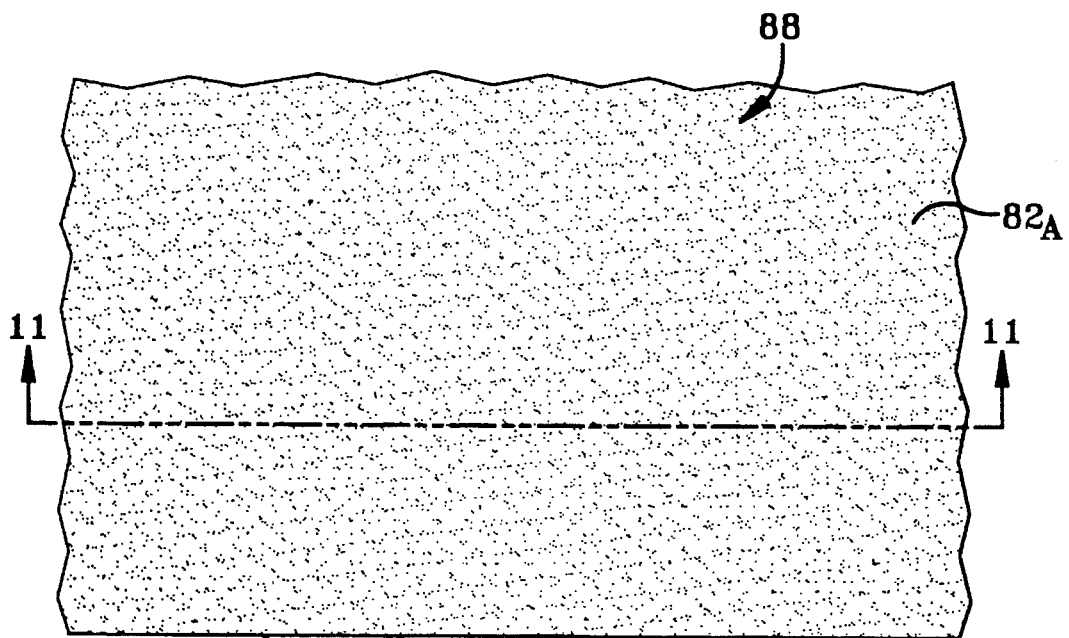
FIG. 10 is a further enlarged sectional view taken substantially along line 10—10 of FIG. 9 to depict, in plan, an alternative form of the surface configuration utilized on the successively engaged metallic coils forming the improved volute spring.
Figure 11:
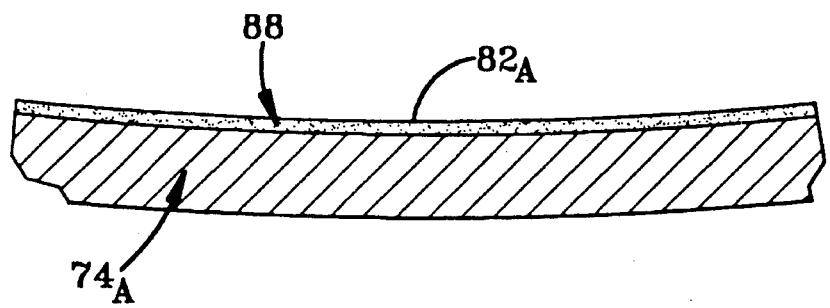
FIG. 11 is a transverse section taken substantially along line 11—11 of FIG. 10.

With reference to FIGS. 9 through 11, one can observe a second embodiment of a volute spring, identified by the numerical designation $10_A$, which employs an alternative engaging surface $82_A$ to provide the desired frictional hysteresis characteristic. A clutch wear or friction material 88 may be bonded to the surface of the metallic strip $74_A$ from which the volute spring $10_A$ is wound. The clutch wear material 88 may comprise a conventional paper and resin combination that has historically been used to provide the frictional engagement for the well known torque transfer devices that include brakes and clutches. Such material is sufficiently porous to preclude the formation of a hydrodynamic oil film. Unlike the prior known volute spring, from which repeated frictional cycles serve to remove the minute surface grooves which preclude the formation of a hydrodynamic oil film, the conventional paper and resin composite friction material does not wear away. Hence, the use of such a wear material on at least one surface of the metallic strip $74_A$ from which the volute spring $10_A$ is wound provides the desired frictional engaging surface that provides the desired extended life for the friction hysteresis characteristic.

The deflection of the volute springs 10 and $10_A$ may be predetermined as a function of the torque level to be transferred through the damper subassembly 16 and the anticipated magnitude of the transient torque spikes. The volute springs 10 and $10_A$ are effective to transmit torque from the plate 18 to the output hub 30. The volute springs 10 and $10_A$ will deflect under the torque load in accordance with the spring rate designed into the springs.

When the volute springs 10 and $10_A$ are employed in combination with a helical compression spring 72, it may be desired to provide different spring rates for the volute springs 10 and/or $10_A$ such that the angular excursion between the plate 18 and the output hub 30 will have at least two phases or stages.

Although it should be abundantly clear that the volute springs 10 and $10_A$ may function without assistance, one may—as illustrated in FIGS. 2 and 4—use a helical compression spring 72 and a volute spring 10 or $10_A$ within the confines of compression spring 72. The helical compression spring 72 may be of the type described in the aforesaid '301 patent. The volute spring 10 and/or $10_A$ has all the characteristics previously described and the combination provided by the springs 10 and 72 allows for a wide variety from which to select in order to provide different spring rates with which to accommodate a wide variety of angular excursions between the plate 18 and the output hub 30, as previously described. The capability provided by this combination allows the designer wide flexibility to accommodate and solve different torsional vibration problems that may occur on a vehicle.

While the stop surfaces shown in the aforesaid '301 patent prevent the full compression of the helical springs 72 to their solid height and thereby extending their life span, it should be realized that the volute springs 10 or $10_A$ need not be provided with such stop arrangements in order to gain the benefits of the present invention. More particularly, the volute springs 10 need only to have the lands 76 and the grooves 78 and 80 placed on at least one of the engaging surfaces so as to maintain the hysteresis characteristics necessary to gain the benefits of the present invention.

It should now be appreciated that the practice of the present invention provides volute springs having a desired frictional hysteresis that will be maintained over relatively long life, and also provides a method of making such volute springs. The volute springs of the present invention are particularly suited to be incorporated into a mechanical device, such as the damper subassembly 16. Furthermore, the volute springs 10 and $10_A$ of the present invention may be used in combination with conventional compression springs in order to provide a wide variety of different spring rates that may be used to provide the solutions to a wide variety of different transient torque vibration problems.

The present invention also provides a method for fabricating the volute spring 10. More particularly, although the grooves may be ground, etched, rolled or chased into the material by processes known in the art, it is important to the present invention that such a process be accomplished before the metal comprising the volute springs is wound into its telescopic configuration. After the grooves are placed into the surface and define the plateaus, and after the metal is wound, the material is then stressed in torsion so as to complete the fabrication process of the volute springs. The volute springs may be further described with reference back to FIG. 1.

It should now be appreciated, that the present invention not only teaches the use of volute springs in a damper subassembly, but also teaches the benefits of using volute springs in other mechanical devices that need a solution for satisfying transient torsional vibration problems.

While only a preferred embodiment and two alternative embodiments of the volute spring are disclosed, it is to be clearly understood that the volute spring is susceptible to numerous changes apparent to one skilled in the art. Therefore, the scope of the present invention is not to be limited to the details shown and described but is intended to include all changes and modifications which come within the scope of the appended claims.

The embodiments of the invention in which an exclusive property or privilege is claimed are defined as follows:

1. A volute spring comprising:

a plurality of telescopically adjacent coils;

each said coil having oppositely directed surfaces which present opposed surfaces on said telescopically adjacent coils;

said opposed surfaces providing a hysteresis frictional engagement therebetween;

at least one of said opposed engaging surfaces having a structural configuration comprised of a porous surface such that engagement of said opposed surfaces obviates the formation of a hydrodynamic oil film from degrading the hysteresis frictional engagement between said adjacent coils.

2. A volute spring, as set forth in claim 1, wherein said porous surface comprises:

a conventional paper and resin clutch wear material that is bonded to at least one said opposed surface.

3. A volute spring comprising:

a plurality of telescopically adjacent coils;

each said coil having oppositely directed surfaces which present opposed surfaces on said telescopically adjacent coils;

at least one of said opposed engaging surfaces having a structural configuration in the nature of a plurality of intersecting grooves which define a plurality of polygonal plateaus;

said plateaus providing the engaging surface on at least one of said adjacent coils that obviates the formation of a hydrodynamic oil film from degrading the hysteresis frictional engagement between said adjacent coils.

4. A volute spring, as set forth in claim 3, wherein:

said plurality of polygonal plateaus are quadrilateral.

5. A volute spring, as set forth in claim 3, wherein:

each said groove has a width in the range of from about 0.001 inches to about 0.100 inches and a depth of at least 0.001 inches.

6. A volute spring, as set forth in claim 5, wherein:

said polygonal plateaus have sides ranging in length from about 0.005 inches to about 0.200 inches.

\* \* \* \* \*